US008985997B2

(12) United States Patent
Klobucar et al.

(10) Patent No.: US 8,985,997 B2
(45) Date of Patent: Mar. 24, 2015

(54) VALVE BUSHING FOR AN INJECTION MOLDING APPARATUS

(71) Applicant: Mold-Masters (2007) Limited, Georgetown (CA)

(72) Inventors: Peter Klobucar, Georgetown (CA); Denis Babin, Georgetown (CA); Fabrice Fairy, Strasbourg (FR)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 71 days.

(21) Appl. No.: 13/783,218

(22) Filed: Mar. 1, 2013

(65) Prior Publication Data
US 2013/0230617 A1 Sep. 5, 2013

Related U.S. Application Data

(60) Provisional application No. 61/606,252, filed on Mar. 2, 2012.

(51) Int. Cl.
*B29C 45/23* (2006.01)
*B29C 45/20* (2006.01)
*B29C 45/28* (2006.01)

(52) U.S. Cl.
CPC ............... *B29C 45/20* (2013.01); *B29C 45/281* (2013.01); *B29C 2045/2889* (2013.01)
USPC ............................ 425/562; 425/563; 425/564

(58) Field of Classification Search
USPC .................. 425/549, 572, 564, 566, 562, 563
See application file for complete search history.

(56) References Cited

U.S. PATENT DOCUMENTS

| 4,173,448 | A | 11/1979 | Rees et al. |
| 4,588,367 | A | 5/1986 | Schad |
| 4,682,945 | A | 7/1987 | Schad |
| 5,071,340 | A | 12/1991 | LaBianca |
| 5,374,182 | A | 12/1994 | Gessner |
| 6,228,309 | B1 | 5/2001 | Jones et al. |

(Continued)

FOREIGN PATENT DOCUMENTS

| DE | 33 36 302 | C2 | 4/1985 |
| DE | 41 04 433 | A1 | 6/1991 |

(Continued)

OTHER PUBLICATIONS

"Hot Runner Systems", *Husky Injection Molding Systems Brochure,* (Sep. 1993).

*Primary Examiner* — Tim Heitbrink
(74) *Attorney, Agent, or Firm* — Medler Ferro PLLC (57) ABSTRACT

A valve bushing having an actuator portion and a pin guiding component is disclosed. The actuator portion has a cup-shaped body with a stepped bore that defines a chamber in which a piston for opening and closing a valve gate disposed, and also defines a transfer bore extending through a base portion of the cup-shaped body. A stand-off member elevates the cup-shaped body from the manifold. The pin guiding component defines a sealing bore that extends between a body portion and a boss that extends rearward from the body portion. The boss is received in the transfer bore of the cup-shaped body to define a thermal transfer area between the pin guiding component and the actuator portion that is spaced apart from the manifold, and the actuator portion is located relative to the pin guiding component by engagement between the pin guiding component and the stand-off member.

27 Claims, 8 Drawing Sheets

(56) References Cited

U.S. PATENT DOCUMENTS

| | | |
|---|---|---|
| 6,343,925 B1 | 2/2002 | Jenko |
| 6,554,604 B1 * | 4/2003 | Schmidt .................. 425/564 |
| 6,555,044 B2 | 4/2003 | Jenko |
| 7,955,071 B1 * | 6/2011 | Adas et al. ................ 425/564 |
| 8,727,766 B2 * | 5/2014 | Hammond ................ 425/549 |
| 2010/0233311 A1 | 9/2010 | Tapuchievici |

FOREIGN PATENT DOCUMENTS

| | | |
|---|---|---|
| JP | 4-067923 A | 3/1992 |
| JP | 2008-213154 A | 9/2008 |
| WO | WO-00/71325 A1 | 11/2000 |
| WO | WO-2009/158091 A1 | 12/2009 |
| WO | WO-2011/161590 A1 | 12/2011 |
| WO | WO 2012/095326 A1 | 7/2012 |
| WO | WO-2012/095327 A1 | 7/2012 |

* cited by examiner

VALVE BUSHING FOR AN INJECTION MOLDING APPARATUS

CROSS-REFERENCE TO RELATED APPLICATIONS

This application claims the benefit under 35 U.S.C. §119(e) of U.S. Appl. No. 61/606,252 filed Mar. 2, 2012, the disclosure of which is incorporated by reference herein in its entirety.

FIELD OF THE INVENTION

This disclosure related to injection molding and more specifically to a valve bushing for injection molding.

BACKGROUND

Many hot runner injection molding systems use a valve bushing having a valve pin coupled to a piston that is actuated between closed and open positions when pressurized air is supplied to a piston chamber to control the flow of molding material into a mold cavity. In some known hot runner designs, for example, those used in the molding of PET preforms, the valve bushing is mounted to the hot runner manifold, and an air seal between an actuator portion of the valve bushing and a sealing surface on an adjacent mold plate through which the pressurized air is delivered is required to efficiently actuate the valve pin. In addition, to prevent molding material, and gasses created during processing of the molding material, from escaping the channels of the hot runner system, a close tolerance fit is required between many of the hot runner components. For example, a fluid seal is required between the valve pin and the valve bushing.

Failure to create an air seal between the actuator portion and the sealing surface of the adjacent mold plate will result in leakage of air to the interior of the injection molding system, which may reduce the overall efficiency of the system due to a need to continuously replace leaking compressed air, and can also result in an inability to translate the pistons, and the valve pins connected thereto, between the open and closed positions.

Since the valve bushing is mounted to the manifold, heat input to the manifold not only causes the manifold to expand, but also causes the valve bushing to expand, which may adversely affect the fit between the valve pin and the valve pin bushing thus allowing molding material and gasses created during processing of the molding material to escape the channels of the hot runner system and migrate into the piston chamber.

Heat loss from the manifold into the actuator portion of the valve bushing may also lead to additional problems, for example, premature wear of piston seals, and decreased thermal efficiency of the manifold as a result of the additional heat input to the manifold that is required due to the aforementioned heat loss.

Heretofore solutions to solve many of the problems associated with manifold mounted valve bushings have not proven to be effective, and as such, a need still exists in the art for a valve bushing that reduces or overcomes at least some of the above described deficiencies.

BRIEF SUMMARY OF THE INVENTION

Embodiments hereof are directed to a valve bushing for a valve gated hot runner system. The valve bushing includes an actuator portion having a cup-shaped body that defines in part a piston chamber in which a piston for opening and closing a valve gate of a hot runner mold is disposed, and stand-off member that elevates the cup shaped body relative to an upstream surface of a manifold. The valve bushing further includes a pin guiding component that defines a sealing bore through which a valve pin that is coupled to the piston is slidably disposed. The pin guiding component has a body portion that is receivable in a bore in the manifold and has a flange that is configured to locate the actuator portion relative to the pin guiding component, and when the manifold is heated to a processing temperature, the clamping force between the manifold and an adjacent mold plate is transferred through the cup-shaped body and the stand-off member.

Embodiments hereof are also directed to a valve bushing for a valve gated hot runner system. The valve bushing includes an actuator portion having a cup-shaped body with a stepped bore extending therethrough. The stepped bore defines in part a piston chamber in which a piston for opening and closing a valve gate of a hot runner mold is disposed, and also defines a transfer bore extending through a base portion of the cup-shaped body. A stand-off member elevates the cup-shaped body relative to an upstream surface of a manifold. The valve bushing further includes a pin guiding component having a body portion that receivable in a bore in the manifold and has a boss that extends rearward from the body portion. The pin guiding component defines a sealing bore that extends between the boss and the body portion, through which a valve pin that is coupled to the piston is slidably disposed. The boss is receivable in the transfer bore of the cup-shaped body to define a thermal transfer area between the pin guiding component and the actuator portion that is spaced apart from the manifold, and the cross sectional area of the boss is less than the cross sectional area of the body portion.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. In the following detailed description "forward" is used as reference direction meaning, towards the parting line of the injection molding system, whereas "rearward" is used as a reference direction meaning, away from the parting line. In the following detailed description "axial" is used with reference to a direction that is generally parallel to an opening and closing axis a valve pin that controls the flow of molding material through a mold gate, whereas "lateral" is used with reference to a direction that is generally perpendicular to the opening and closing axis of the valve pin. Although the description of embodiments hereof is in the context of a hot runner injection molding system for use in PET injection molding, the invention may also be used in other molding arrangements where it is deemed useful. Furthermore, there is no intention to be bound by any expressed or implied theory presented in the preceding technical field, background, brief summary or the following detailed description.

Figure 1:
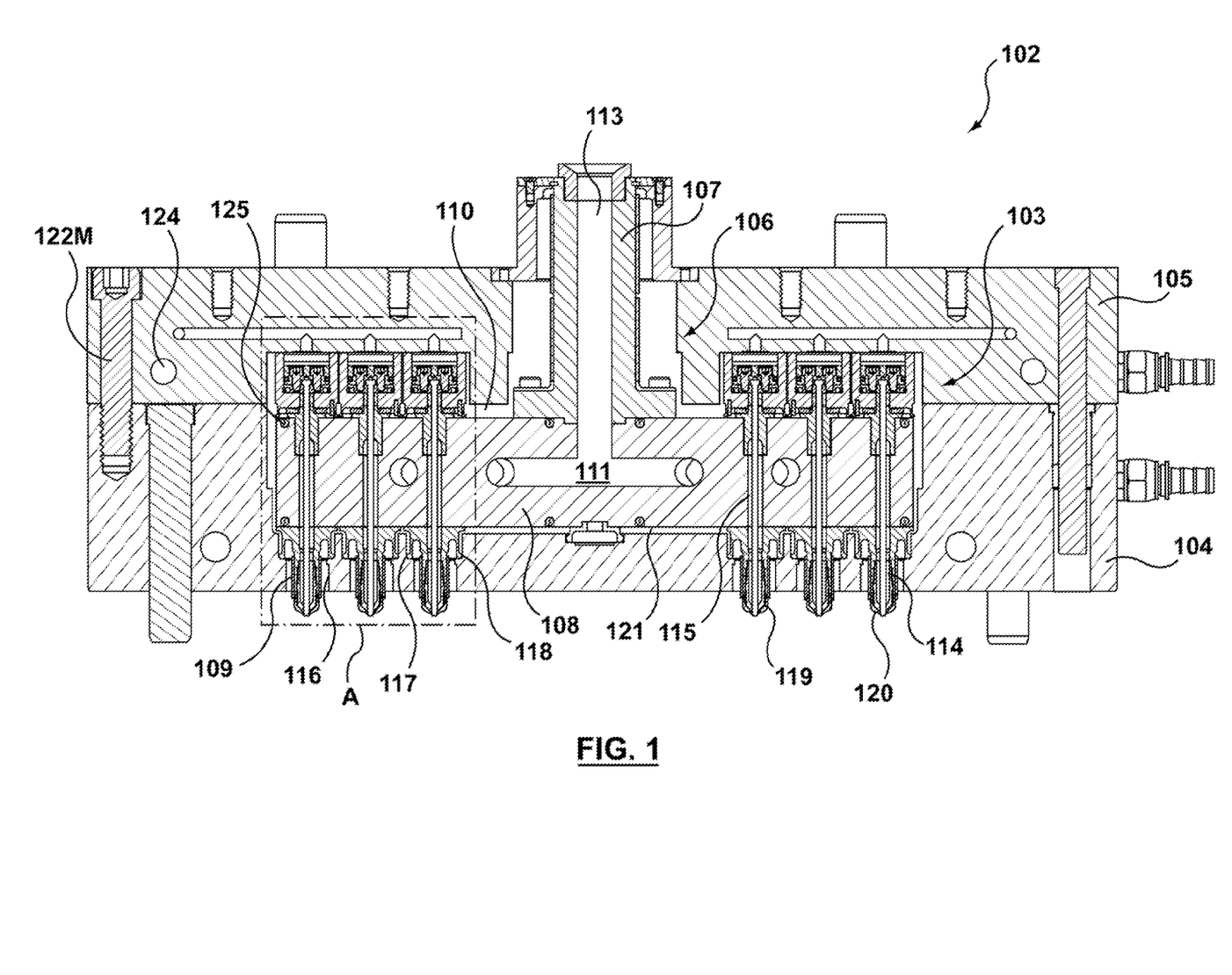
FIG. 1 is a sectional view of a hot-half of an injection molding system having a valve bushing in accordance with an embodiment hereof.

FIG. 1 is a sectional view of a hot-half 102 of an injection molding system having a valve bushing 103 in accordance with an embodiment hereof. Hot half 102 includes, inter alia, a manifold plate 104 and a back plate 105, and is coupled to the stationary platen of a molding machine (not shown) by back plate 105. Hot half 102 further includes, a hot runner system 106 which includes an inlet 107 a manifold 108, a nozzle 109 and valve bushing 103. Manifold 108 is positioned between nozzle 109 and back plate 105 and is surrounded by an airspace 110 that is defined between manifold plate 104 and back plate 105. Airspace 110 is sized to create a thermal break between manifold 108 and the surrounding mold plates 104, 105. Manifold 108 is provided with a series of melt channels or manifold channels 111 (partially shown) for delivering a supply of melt, or molding material, provided by the injection molding machine, from an inlet channel 113 defined by inlet 107, to a nozzle channel 114 defined by nozzle 109, via a manifold outlet 115. Nozzle 109 then delivers the molding material to a mold cavity (not shown) via a mold gate (not shown).

A nozzle bore 116, in which nozzle 109 is disposed, extends through manifold plate 104. Nozzle bore 116 is sized to create an insulating air space that establishes a thermal break between nozzle 109 and manifold plate 104. Nozzle bore 116 further defines a shoulder 117 that locates and supports an upstream end of nozzle 109 within hot half 102 via a nozzle flange 118 located proximate an upstream end of nozzle 109. A downstream end of nozzle 109 is located relative to hot-half 102 via engagement between a nozzle tip 119 and a nozzle tip bore in a cavity plate (not shown). In the current embodiment, nozzle tip 119 includes a tip insulator 120. In an alternate embodiment, (not shown) tip insulator 120 is omitted, and nozzle tip 119 may include more or fewer pieces. In an embodiment, nozzle tip 19 may also be referred to as a nozzle seal.

As will be discussed in further detail below, in operation, i.e., when hot runner system 106 is heated to a processing temperature, the nozzle flange and shoulder arrangement between nozzle 109 and manifold plate 104 allows the load created by axial thermal expansion of manifold 108 to bear upon back plate 105 to create a sealing force between a downstream surface 121 of manifold 108 and nozzle 109.

In the current embodiment back plate 105 and manifold plate 104, which may be referred to as mold plates 105, 104, are coupled together by socket head cap screws 122M or the like, and hot half 102 may include, inter alia, additional mold plates or fastening/aligning features such as dowels, taper locks, or the like. Back plate 105 and manifold plate 104 may also include cooling conduits, such as cooling conduit 124 called out on back plate 105 only, in fluid communication with a fluid source (not shown) for maintaining hot-half 102 at a required molding temperature.

In the current embodiment, each of inlet 107, manifold 108, and nozzle 109 is provided with a heater, such as embedded resistance heater 125 called out on manifold 108 only, and also includes a thermocouple (not shown), which in conjunction with a temperature controller (not shown), maintains inlet 107, manifold 108, and nozzle 109, and subsequently the molding material flowing therethrough, at a desired processing temperature. The number and type of heaters described is by way of example and not limitation. In an alternate embodiment (not shown) only some of inlet 107, manifold 108, and nozzle 109, are provided with a heater and/or a thermocouple.

Figure 2A:
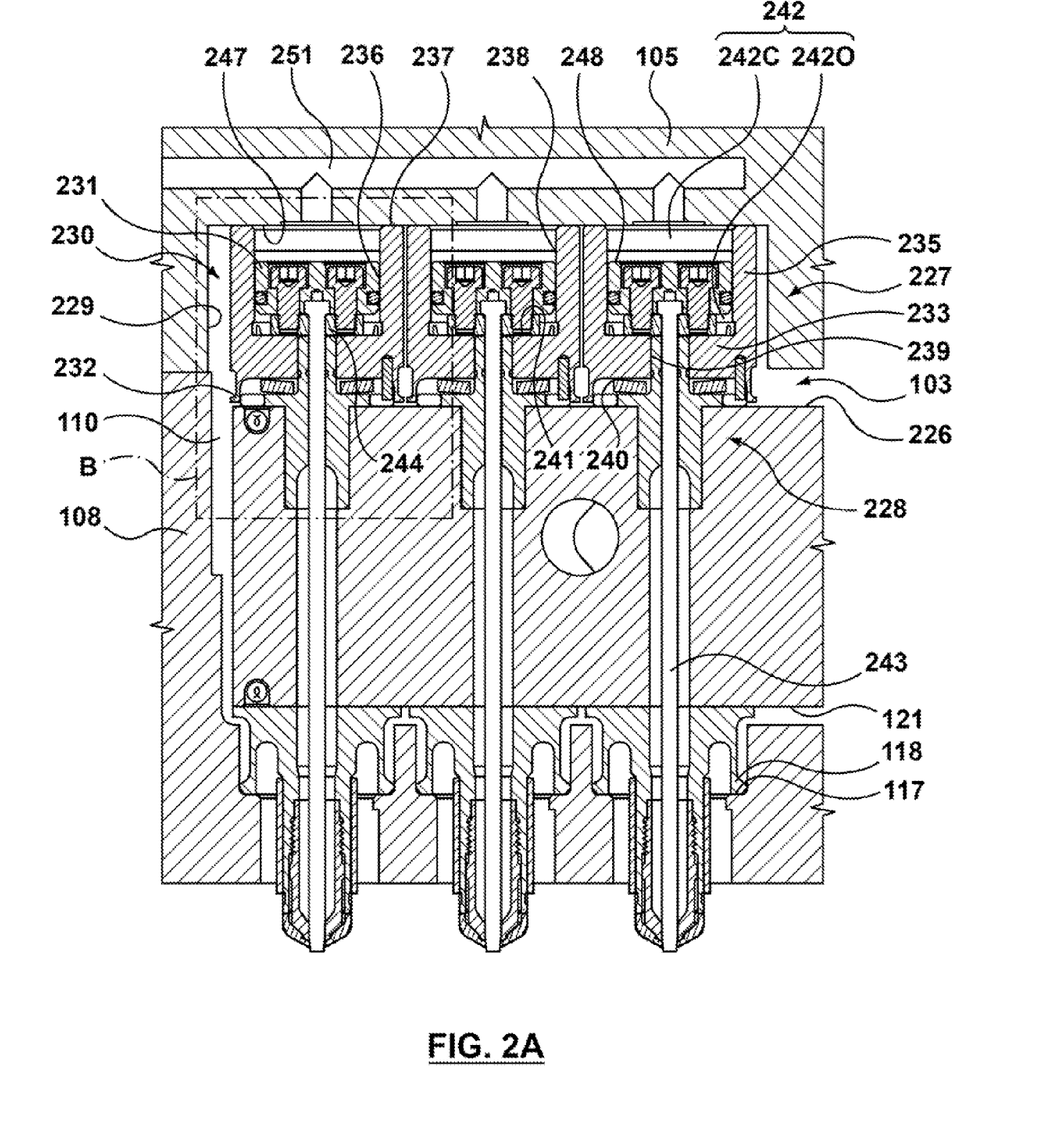
FIG. 2A is an enlarged view of a portion A of the hot-half of FIG. 1 in an unheated state.
Figure 2B:
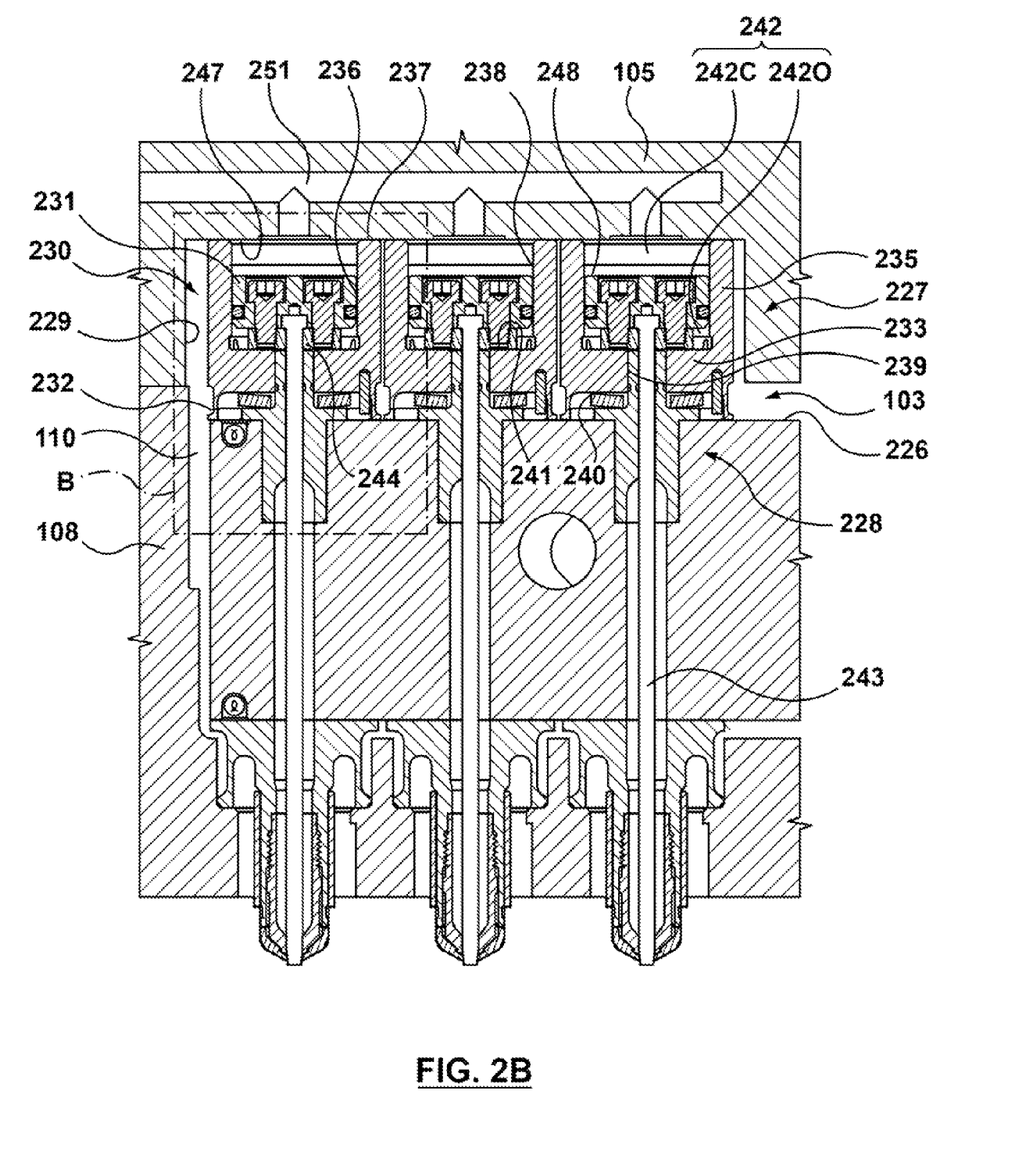
FIG. 2B is an enlarged view of the portion A of the hot-half of FIG. 1 in a heated state.

Referring now to FIGS. 2A and 2B, where FIG. 2A is an enlarged view of a portion A of hot-half 102 of FIG. 1, in which manifold 108 is in an unheated state, and FIG. 2B is an enlarged view of the portion A of the hot-half 102 of FIG. 1 in which manifold 108 is in a heated state. Valve bushing 103 is disposed on an upstream, or rearward, surface 226 of manifold 108, between manifold 108 and back plate 105. Valve bushing 103 includes an actuator portion 227 and a pin guiding component 228. In the current embodiment back plate 105 is provided with pockets, or recesses 229 which extend airspace 110 to accommodate actuator portion 227. In an alternate embodiment (not shown), back plate 105 does not include recesses 229, and the height of actuator portion 227 is accommodated by an intermediate frame plate, or spacer plate.

Actuator portion 227 includes a generally cup-shaped body 230, a piston 231, and a flange, or stand-off member 232 arranged about a central axis $A_C$. Cup-shaped body 230 includes a base portion 233 and a perimeter wall 235 that extends rearward from base portion 233. A stepped bore 236 extends from an open end 237 of cup-shaped body 230 through base portion 233 to define a piston bore 238 and a transfer bore 239. Piston bore 238 is defined by an inside surface of perimeter wall 235 and transfer bore 239 extends between forward and rearward surfaces 240, 241 of base portion 233. In the current embodiment, cup-shaped body 230 can be made from tool steel, an example of which includes H-13. Also, in the current embodiment perimeter wall 235 and base portion 233 are integrally formed; however, in an alternate embodiment perimeter wall 235 and base portion 233 are discrete components that are made from the same material, or are made from different materials.

Piston bore 238 defines in part a piston chamber 242 which includes a gate open chamber 242O and a gate closed chamber 242C. Piston 231 is positioned within piston chamber 242 and is sealably engaged with piston bore 238. A valve pin 243 is coupled to piston 231, by a valve pin retainer 244, to translate axial movements of piston 231 into axial movements of valve pin 243. Piston 231 divides piston chamber 242 into gate open chamber 242O and gate closed chamber 242C. Thus, in the embodiment shown, gate open chamber 242O is defined by piston bore 238, a forward surface 246 of piston 231 and a rearward surface 241 of base portion 233, whereas, gate closed chamber 242C is defined by piston bore 238, a sealing surface 247 of back plate 105 and a rearward surface 248 of piston 231.

Figure 6:
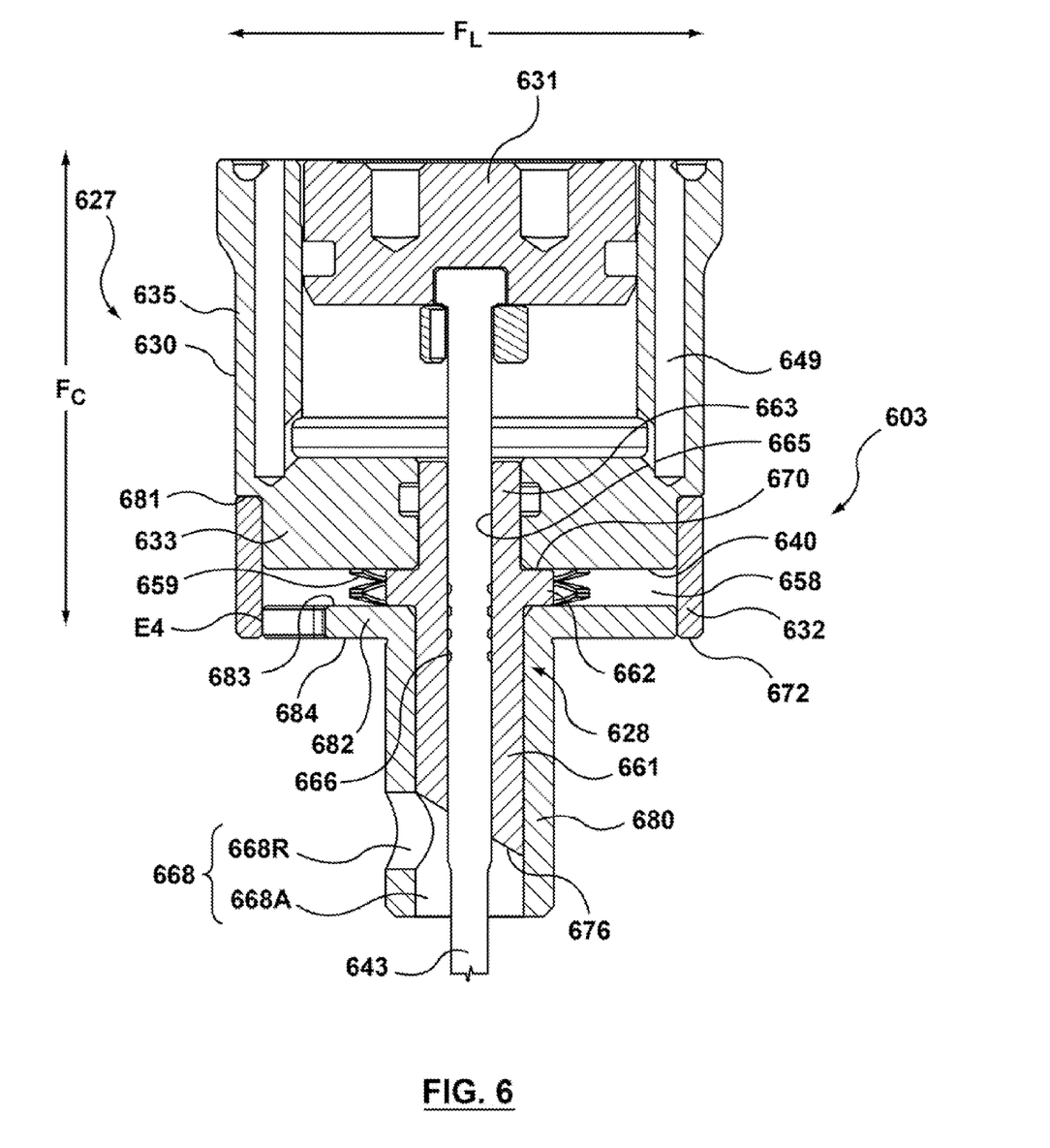
FIG. 6 is a sectional view of a valve bushing in which the pin guiding component is disposed in a sleeve member in accordance with another embodiment hereof.

A plurality of open actuation conduits 649 (shown in FIG. 6) extend through perimeter wall 235 between open end 237 of cup-shaped body 230 and gate open chamber 242O, such that pressurized fluid introduced to gate open chamber 242O via an open fluid conduit (not shown) in back plate 105 actuates piston 231, and valve pin 243 rearward to a gate open position (as shown in FIG. 6) in which valve pin 243 is retracted from the mold gate (not shown) to permit the stream of moldable material supplied by the molding machine to flow from hot runner system 106, through the mold gate (not shown) and into the mold cavity (also not shown). A closed fluid conduit 251 in back plate 105 is in fluid communication with gate closed chamber 242C such that pressurized fluid introduced to gate closed chamber 242C via closed fluid conduit 251 actuates piston 231 and valve pin 243 forward to a gate closed position (see FIGS. 3A-7) in which valve pin 243 is engaged with the mold gate (not shown) to prevent the melt stream of moldable material from flowing through the mold gate (not shown) and into the mold cavity (also not shown).

Figure 3A:
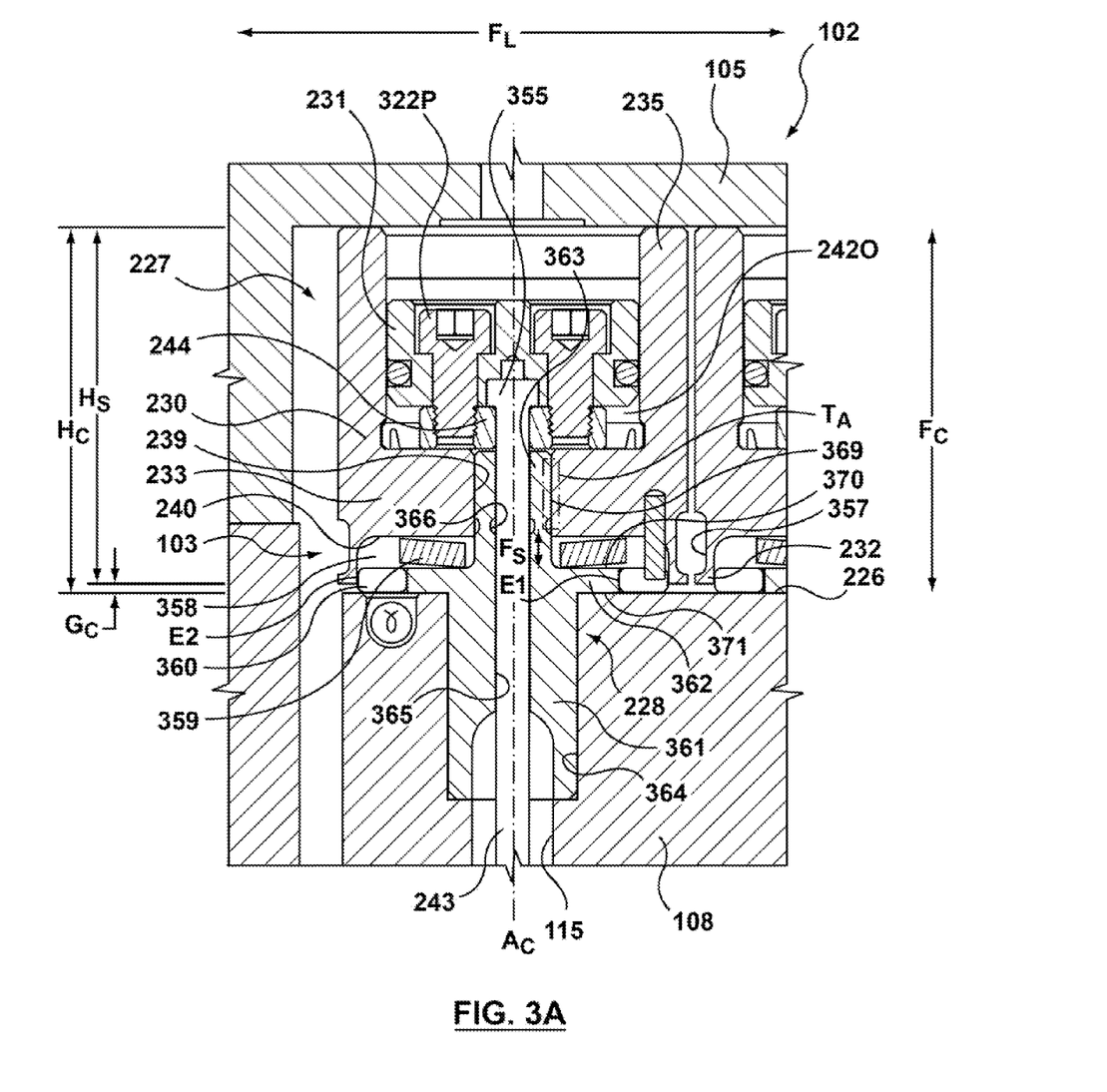
FIG. 3A is an enlarged view of a portion B of FIG. 2A depicting a valve bushing, and a portion of a manifold in the unheated state.
Figure 3B:
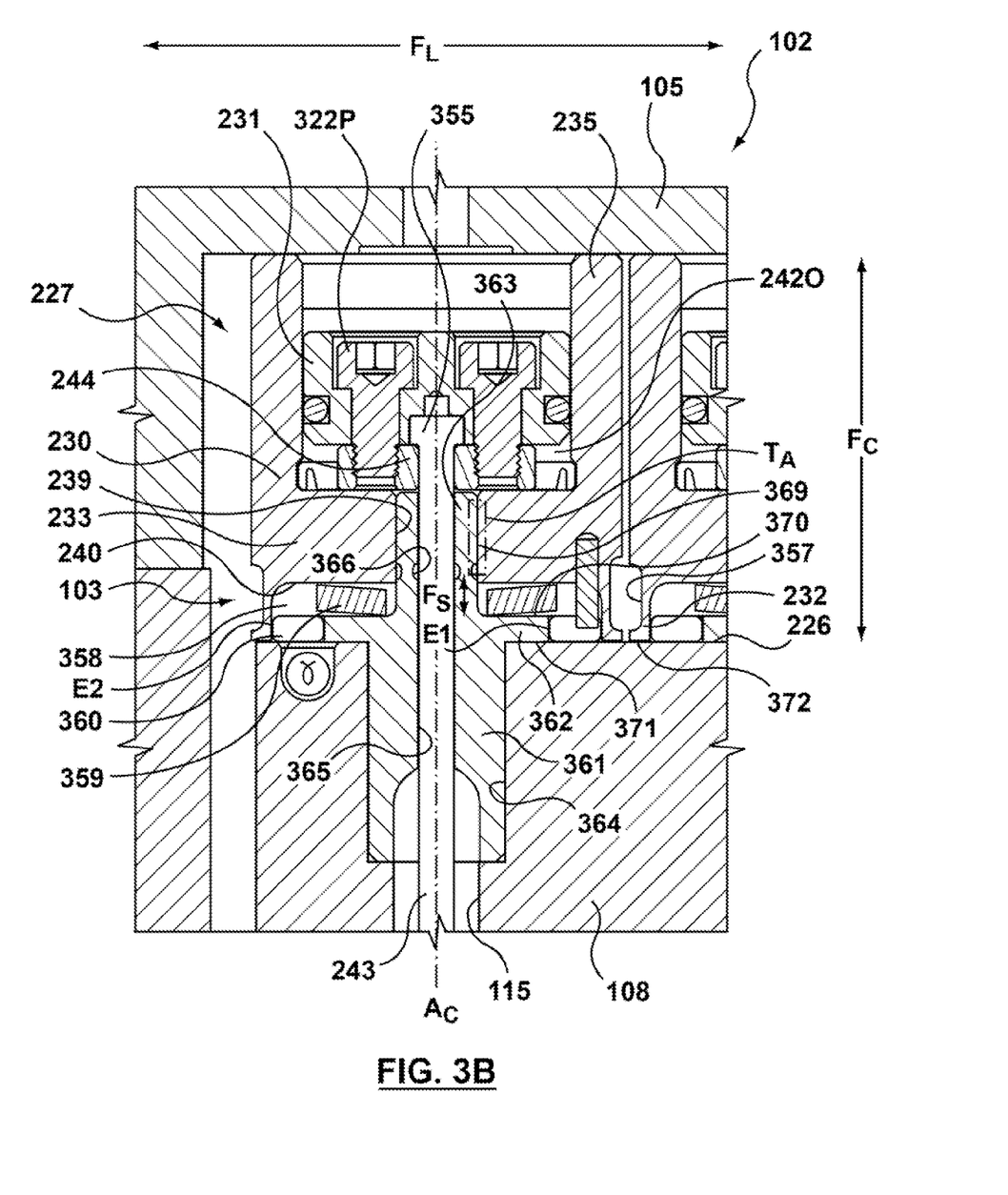
FIG. 3B is an enlarged view of a portion B of FIG. 2B depicting a valve bushing, and a portion of a manifold in the heated state.

Referring now to FIGS. 3A and 3B, where FIG. 3A is an enlarged view of a portion B of FIG. 2A depicting valve bushing 103, and a portion of manifold 108 in the unheated state, and FIG. 3B is an enlarged view of a portion B of FIG. 2B depicting valve bushing 103, and a portion of manifold 108 in the heated state. Valve pin 243 is removably coupled to piston 231 by valve pin retainer 244 that is removably coupled to piston 231 by a pair of socket head cap screws 322P. To facilitate assembly and disassembly, valve pin retainer 244 is provided with a C-shaped slot 454 (shown FIG. 4) such that upon removal of socket head cap screws 322P, valve pin retainer 244 can be displaced laterally relative to valve pin 243. In the current embodiment, since the diameter of transfer bore 239 is greater than the diameter of a head portion 355 of valve pin 243, actuator portion 227 can be removed from hot half 102 without also having to remove valve pin 243. In alternate embodiments hereof, other connections between piston 231 and valve pin 243 are contemplated as would be understood by one of ordinary skill in the art without departing from the scope of the present disclosure.

As discussed above, actuator portion 227 includes cup-shaped body 230, and stand-off member 232. Stand-off member 232 extends from forward surface 240 of base portion 233 in the form of a flange or skirt. Stand-off member 232 elevates cup-shaped body 230 from manifold 108 to reduce contact between actuator portion 227 and manifold 108, which reduces thermal transfer there between. The thickness of cup-shaped body 230 is chosen such that cup-shaped body 230 is rigid enough to withstand the substantially all of the clamping force $F_C$ between manifold 108 and back plate 105 as a result of axial thermal expansion of manifold 108, and the thickness of stand-off member 232 is chosen such that stand-off member 232 is rigid enough to withstand the substantially all of the clamping force $F_C$ between manifold 108 and back plate 105 while also preventing stand-off member 232 from hobbing into upstream surface 226 of manifold 108. In the current embodiment stand-off member 232 is scalloped, as shown at 357, to further reduce thermal transfer between actuator portion 227 and manifold 108.

Stand-off member 232, and forward surface 240 of base portion 233, define a pocket 358 between cup-shaped body 230 and the upstream surface 226 of manifold 108 in which a biasing member 359 and a locating spacer, or transfer ring 360 are disposed. In the current embodiment, stand-off member 232 is depicted as a continuous annular flange or skirt by way of example and not limitation. In an embodiment (not shown) stand-off member 232 may be castellated to reduce surface contact between stand-off member 232 and manifold 108, and/or may be provided with one or more holes extending laterally therethrough, to assist in reducing thermal transfer between manifold 108 and actuator portion 227. In another embodiment (not shown) stand-off member 232 is provided in the form of a plurality of legs.

Continuing with FIGS. 3A and 3B, pin guiding component 228 includes a body portion 361, a sealing flange 362 and a boss, or protrusion 363 extending rearward from the body portion 361. Body portion 361 is received in a stepped bore 364, provided in the upstream surface of manifold 108 that intersects with manifold outlet 115. In an embodiment, the fit between body portion 361 and stepped bore 364 is a slide fit such that pin guiding component 228 is removable from stepped bore 364; however, in an alternate embodiment, the fit between body portion 361 and stepped bore 364 is an interference fit such that pin guiding component 228 is more permanently installed in stepped bore 364.

Pin guiding component 228 defines a sealing bore 365 extending therethrough, through which valve pin 243 is slidably received. Sealing bore 365 is sized to permit translation of valve pin 243 between the gate open and gate closed positions while maintaining a fluid seal there between. Sealing bore 365 may be of a continuous diameter, or can optionally include one or more undercuts 366 in which molding material that may migrate between valve pin 243 and sealing bore 364 can collect.

Figure 5:
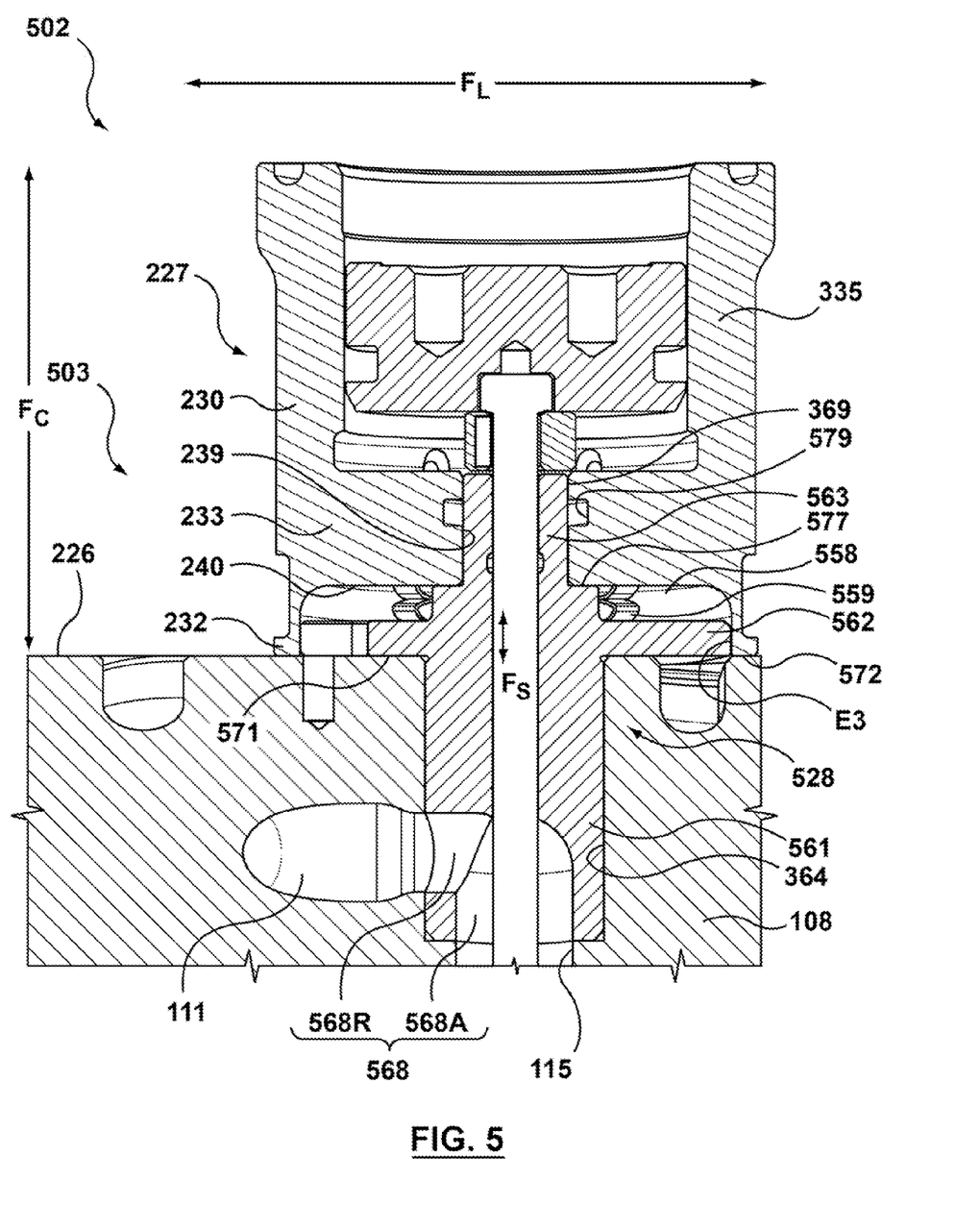
FIG. 5 is a sectional view of a valve bushing with a pin guiding component that defines a step, and a portion of a manifold in the heated state, in accordance with another embodiment hereof.

Referring briefly to FIG. 5, pin guiding component 528 includes a diverting channel 568 (as shown in FIG. 5) that directs molding material from manifold channel 111 to manifold outlet 115. In the current embodiment, diverting channel 568 includes an axial diverting segment 568A that is correspondingly sized to, and is aligned with, manifold outlet 115. Diverting channel 568 also includes a radial diverting segment 568R correspondingly sized to, and aligned with, manifold channel 111.

Returning to FIGS. 3A and 3B, boss 363 of pin guiding component 228 extends rearward relative to the upstream surface 226 of manifold 108 and, as measured perpendicular to central axis $A_C$, boss 363 has a smaller cross-sectional area than that of body portion 261. Boss 363 is sized to be slidably received in transfer bore 239. In the current embodiment, boss 363 and transfer bore 239 are sized such that a gap 369 exists there between; however, gap 369 must be small enough to ensure that fluid loss between boss 363 and transfer bore 239 is negligible, or nil, when pressurized fluid is introduced to open chamber portion 242O. Boss 363 together with transfer bore 239 define a thermal transfer area, as shown at region $T_A$, through which heat from manifold 108 that migrates through pin guiding component 228 is dissipated. Boss 363 spaces transfer area $T_A$ apart from manifold 108, and since the cross-sectional area of boss 363 is smaller than the cross-sectional area of body portion 361, heat from manifold 108 that migrates through boss 363 is obstructed, or choked, before dissipating to actuator portion 227 at transfer area $T_A$.

In addition boss 363 increases the length of sealing bore 365 such that a portion of sealing bore 365 is spaced apart from manifold 108. Accordingly, the portion of sealing bore 365 in pin guiding component 228 that is defined by boss 363 is subject to less thermal expansion than the portion of sealing bore 365 that is within manifold 108, which assists in maintaining a fluid seal between valve pin 243 and sealing bore 365.

Sealing flange 362 extends radially outward from pin guiding component 228 between boss 363 and body portion 361. A rearward surface 370 of sealing flange 362 defines a surface upon which biasing member 359 presses to urge a forward surface 371 of sealing flange 362 into contact with the upstream surface 226 of manifold 108. Contact between forward surface 371 of sealing flange 362 and the upstream surface 226 of manifold 108 creates a mechanical seal there between which prevents molding material that may migrate between manifold stepped bore 364 and body portion 361 from migrating into pocket 358 and piston chamber 242.

In the current embodiment, in comparison to cup-shaped body 230, pin guiding component 228 is made from a material having a lower coefficient of thermal expansion and a lower thermal conductivity, examples of which include a high chromium steel alloy.

As discussed above, transfer ring 360 is disposed within pocket 358. An inside diameter of transfer ring 360 is sized to fit around, or engage with an outside diameter of sealing flange 362, as shown at location E1, whereas an outside diameter of transfer ring 360 is sized to fit within, or engage with an inside diameter of stand-off member 232, as shown at location E2. Transfer ring 360 rests on the upstream surface 226 of the manifold 108 and locates actuator portion 227 relative to pin guiding component 228 by engagement there between at locations E1 and E2. Further, as manifold 108 grows laterally due to thermal expansion, the relative position of pin guiding component 228 within hot half 102 changes. Due to the engagement between transfer ring 360 and pin guiding component 228 at location E1 and the engagement between transfer ring 360 and actuator portion 227 at location E2, movement of pin guiding component 228 as a result of lateral expansion of manifold 108 also moves actuator portion 227 and the lateral force $F_L$ created by thermal expansion of manifold 108 is transferred to actuator portion 227 via transfer ring 360.

In the current embodiment transfer ring 360 is an annular ring having continuous inside and outside diameters; however, in an alternate embodiment (not shown) the inside and/or the outside diameters of transfer ring 360 are castellated or are scalloped to reduce overall engagement between transfer ring 360, pin guiding component 228, and actuator portion 227 at respective locations E1 and E2. In another alternate embodiment (not shown) transfer ring 360 is hexalobular, or otherwise shaped, to reduce the overall surface contact between transfer ring 360 and stand-off member 232, and pin guiding component 228. In the current embodiment, transfer ring 360 is made from tool steel, an example of which includes H-13; however in another embodiment, transfer ring 360 is made from a material that is more insulative than the material selected for cup shaped body 130, an example of an insulative material includes titanium or a titanium alloy.

As discussed above, biasing member 359 is disposed in pocket 358. Biasing member 359 is positioned around boss 363 between pin guiding component 228 and actuator portion 227 to create a spring force $F_S$ between sealing flange 362 and base portion 233 of cup-shaped body 230. Spring force $F_S$ urges actuator portion 227 away from manifold 108 and into contact with back plate 105, and also urges sealing flange 362 into contact with manifold 108, and manifold 108 into contact with nozzle 109 (not shown in FIGS. 3A and 3B).

In the current embodiment, biasing member 359 is provided in the form of a Belville washer. The contact between biasing member 359 and each of pin guiding component 228 and actuator portion 227 can generally be referred to as a "line contact", that is, contact over a relatively narrow area, which serves to reduce thermal transfer from manifold 108 to actuator portion 227 via biasing member 359.

Referring to FIG. 2A and also to FIG. 3A, when hot runner system 106 is unheated, the height $H_C$ from the upstream surface 226 of manifold 108 to sealing surface 247 of recess 229 is designed to be greater than the stack height $H_S$ of cup-shaped body 230 and stand-off member 232, such that spring force $F_S$ created by biasing member 359 creates a clearance gap $G_C$ between a forward surface 372 of stand-off member 232 and upstream surface 226 of manifold 108.

Referring to FIG. 2B, and also to FIG. 3B, as manifold 108 and nozzle 109 are heated, manifold 108 undergoes thermal expansion in the axial direction. Since nozzle flange 118 is seated in shoulder 117 and downstream surface 121 of manifold 108 (see FIG. 1) rests upon nozzle 109, axial thermal expansion of manifold 108 is in the rearward direction. As manifold 108 is heated to the required processing temperature, axial thermal expansion of manifold 108 causes biasing member 359 to compress until a forward surface 372 of stand-off member 232 engages with the upstream surface 226 of manifold 108, and clearance gap $G_C$ is eliminated. At this point, further axial thermal expansion of manifold 108 causes clamping force $F_C$ between back plate 105 and manifold 108 to be transmitted through perimeter wall 235 and stand-off member 232 to create a sealing load between nozzle 109 and downstream surface 121 of manifold 108. Since biasing member 359 bears upon a forward surface 240 of base portion and rearward surface 370 of sealing flange 362, spring force $F_S$ maintains forward surface 371 of sealing flange 362 into contact with upstream surface 226 of manifold 108 which retains pin guiding component 228 in manifold 108. In the current embodiment, sealing flange 362 is an integral portion of pin guiding component 228; however, in an alternate embodiment (not shown) sealing flange 362 is a discrete component that mates with pin guiding component 228 such that spring force $F_S$ is transferred through sealing flange 362 to pin guiding component 228 to retain pin guiding component 228 in manifold 108.

In general, the size of clearance gap $G_C$ is calculated based in part on the expected thermal expansion manifold 108 in the axial direction, and is generally less than the overall amount that manifold 108 is expected to grow in the axial direction such that full thermal expansion of manifold in the axial direction creates a sealing load between manifold 108 and nozzle 109.

In addition to the expected thermal expansion of manifold 108 in the axial direction, calculation of clearance gap $G_C$ may also consider other parameters including, inter alia, the processing temperatures of the molding materials that are expected to be processed in hot runner system, the material and size of the various hot runner components, and the temperature of cooling fluid flowing through fluid conduits.

As described above, biasing member 359 urges actuator portion 227 away from the upstream surface 226 of manifold 108 to define clearance gap $G_C$ that eliminates direct contact between manifold 108 and actuator portion 227 when the injection molding system is unheated, or more specifically when manifold 108 is unheated. When heat is initially applied to manifold 108, for example at start-up, heat transfer between manifold 108 and actuator portion 227 is limited, thus promoting that heat energy input into manifold 108 on start-up remains in manifold 108 and is not directly transmitted to actuator portion 227.

Further, biasing member 359 also promotes a fluid seal between open end 237 of cup-shaped body 230 and open (not shown) and closed fluid conduit 251, which reduces the likelihood of air leakage from open (not shown) and closed fluid conduit 251, into airspace 110. Such air leakage may have an adverse cooling effect on manifold 108 at the region proximate the air leakage, which may in turn also have an adverse cooling effect on the molding material in the portion of manifold channel 111 that is proximate to the air leakage, and may ultimately have an adverse effect on the molded articles created in mold cavities that are fed thereby. In an embodiment, biasing member 359 may also help to create a fluid seal between manifold 108 and nozzle 109 while manifold 108 and nozzle 109 are heated to the required processing temperature.

Figure 4:
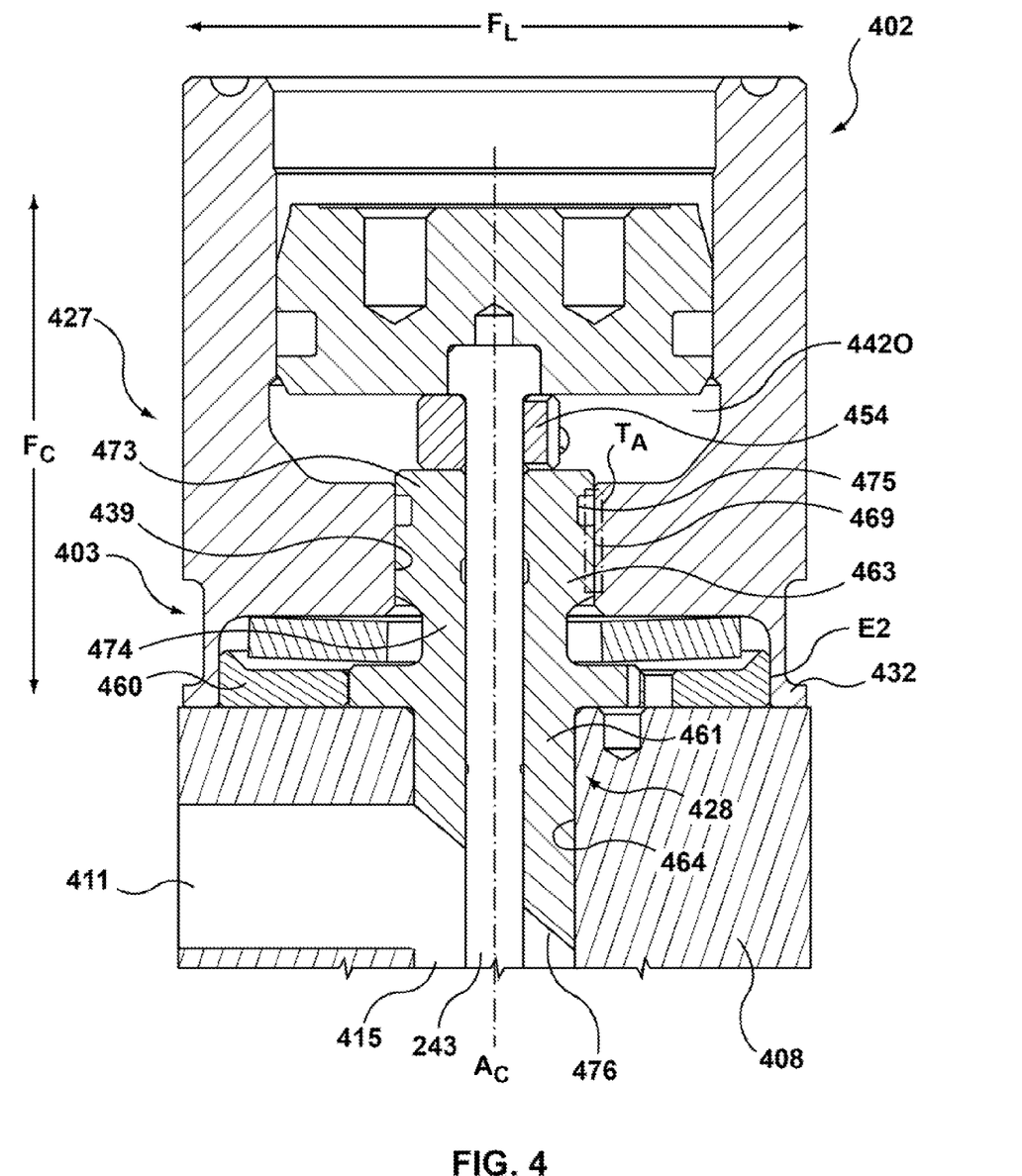
FIG. 4 is a sectional view of a valve bushing with a pin guiding component with an enlarged head, and a portion of a manifold, in the heated state in accordance with another embodiment hereof.

FIG. 4 is a sectional view of valve bushing 403, and a portion of manifold 408 in a heated state, in which boss 463 of pin guiding component 428 is provided with a head portion 473 and a neck portion 474 in accordance with another embodiment hereof. Features and aspects of other embodiments described herein may be used accordingly with the current embodiment and the same reference numbers are used for features of hot-half 102 that remain unchanged from hot half 402 and/or other embodiments described herein, as such those features may not be further described herein.

In the previous embodiment, boss 463 and transfer bore 439 are closely sized to prevent fluid loss there between when pressurized fluid introduced to open chamber portion 4420. In the current embodiment the size of the gap 469 between boss 463 and transfer bore 439 is increased such that lateral thermal expansion of manifold 408 does not permit boss 463 to bear upon transfer bore 439; however the size of gap 469 is not so large as to prevent thermal transfer between boss 463 and actuator portion 427. In an embodiment the size of gap 469 is between 0.05 mm and 0.25 mm. Accordingly, as manifold 408 grows laterally due to thermal expansion, the lateral force $F_L$ created by thermal expansion of manifold 408 is transferred to actuator portion 427 entirely by transfer ring 460. To distribute the lateral force $F_L$ between transfer ring 460 and stand-off member 432 the outer diameter of transfer ring 460 is increased to likewise increase engagement between transfer ring 460 and stand-off member at location E2. Given the increased gap between boss 463 and transfer bore 439, boss 463 is provided with head portion 473 that defines an annular groove 475 in which an o-ring (not shown) is held to create the fluid seal between boss 463 and transfer bore 439.

In the current embodiment head portion 473 together with transfer bore 439 define a thermal transfer area, as shown at region $T_A$. In the current embodiment the length of head portion 473 is less than its diameter. As measured perpendicular to central axis $A_C$ the cross-sectional area of neck portion 474 is less than the cross-sectional area of body portion 461, and the cross sectional area of head portion 473 is greater than the cross-sectional area of neck portion 474. Accordingly, heat from manifold 408 that migrates from body portion 461 through neck portion 474 is obstructed, or choked, before dissipating to head portion 473 and to actuator portion 427 at transfer area $T_A$ which may provide for increased dissipation of heat between pin guiding portion 428 and actuator portion 427.

In the current embodiment, rather than define an enclosed diverting channel, pin guiding component 428 includes a beveled surface 476 at the forward end of body portion 461 to direct molding material from manifold channel 411 to manifold outlet 415. Beveled surface 476 permits pin guiding component 428 and stepped bore 464 to be a smaller diameter than in the previous embodiments and also permits removal of pin guiding component 428 from stepped bore 464 without having to shear molding material that extends between manifold channel 411 and an enclosed radial diverting channel such as radial diverting channel 568R shown in FIG. 5.

FIG. 5 is a sectional view of valve bushing 503, and a portion of manifold 108 in a heated state, in which the pin guiding component 528 defines a step 577, and the transfer ring is an integral part of pin guiding component 528 in accordance with another embodiment hereof. Features and aspects of other embodiments described herein may be used accordingly with the current embodiment and the same reference numbers are used for features of injection molding apparatus 502 that remain unchanged from injection molding apparatus 102 and/or other embodiments described herein, as such, those features may not be further described herein.

Pin guiding component 528 includes a body portion 561, a sealing flange 562 and a boss 563. Body portion 561 is received in a stepped bore 364 in the upstream surface 226 of manifold 108 that intersects with manifold outlet 115. In the current embodiment body portion 561 also extends rearward from sealing flange 562 to define step 577 between boss 563 and sealing flange 562.

Boss 563 of pin guiding component 528 extends rearward relative to the upstream surface 226 of manifold 108, and is sized to be received in transfer bore 239 with gap 369 there between. To create a fluid seal between boss 563 and transfer bore 239 an annular groove 579 is formed in transfer bore 239 in which an o-ring (not shown) is held to create the fluid seal.

Sealing flange 562 extends radially outward from pin guiding component 528 between step 577 and body portion 561. In the current embodiment the transfer ring is omitted, and the diameter of sealing flange 562 is sized to fit within, or engage with an inside diameter of stand-off member 232, as shown at location E3 such that sealing flange 562 locates actuator portion 527 relative to pin guiding component 528 by engagement there between at locations E3. Further, as manifold 108 grows laterally due to thermal expansion, the relative position of pin guiding component 528 within hot half 502 changes. Due to the engagement between sealing flange 562 and actuator portion 227 at location E3, movement of pin guiding component 528 as a result of lateral expansion of manifold 108 also moves actuator portion 227, and the lateral force $F_L$ created by thermal expansion of manifold 108 is transferred to actuator portion 227 via sealing flange 562.

As discussed above, biasing member 559 is disposed in pocket 558. Biasing member 559 is positioned between sealing flange 562 and actuator portion 227 to create a spring force $F_S$ between sealing flange 562 and base portion 233 of cup-shaped body 230. Spring force $F_S$ urges actuator portion 227 away from manifold 108, and also urges sealing flange 562 into contact with manifold 108, and manifold 108 into contact with nozzle 109 (not shown in FIG. 5).

As manifold 108 is heated to the required processing temperature, axial thermal expansion of manifold 108 causes biasing member 559 to compress until forward surface 240 of base portion 233 engages step 577 and forward surface 572 of stand-off member 232 engages upstream surface 226 of manifold 108. At this point, axial thermal expansion of manifold 108 causes clamping force $F_C$ between back plate 105 (not shown in FIG. 5) and manifold 108 to be transmitted through base portion 233 and pin guiding component 528, and also through perimeter wall 235 and stand-off member 232, to create a sealing load between nozzle 109 (not shown in FIG. 5) and downstream surface 121 (not shown in FIG. 5) of manifold 108.

In the current embodiment, since base portion 233 bears upon step 577, clamping force $F_C$ maintains the forward surface 571 of sealing flange 562 into contact with upstream surface 226 of manifold 108 which retains pin guiding component 528 in manifold 108. Contact between forward surface 571 of sealing flange 562 and upstream surface 226 of manifold 108 creates a mechanical seal there between that prevents molding material that may migrate between stepped bore 364 and body portion 561 from migrating into pocket 558. In the current embodiment, biasing member 559 is provided in the form of a wave spring or a helical spring.

FIG. 6 is a sectional view of a valve bushing 603 in which the stand-off member 632 is a discrete component and pin guiding component 628 is disposed in an outer sleeve member 680 in accordance with another embodiment hereof. Features and aspects of other embodiments described herein may be used accordingly with the current embodiment and the same reference numbers are used for features of valve bushing 603 that remain unchanged from valve bushing 103 and/or other embodiments described herein, as such those features may not be further described herein.

Actuator portion 627 includes cup-shaped body 630, a piston 631, and stand-off member 632. In the current embodiment, stand-off member 632 is a discrete component from cup-shaped body 630. Cup-shaped body 630 includes base portion 633 and perimeter wall 635 that extends rearward from base portion 633, and stand-off member 632 engages with base portion 633 at a shoulder 681 that is defined by base portion 633. In the current embodiment, stand-off member 632 can be made from tool steel, an example of which includes H-13; however in another embodiment, stand-off member 632 made from an insulative material, an example of which includes titanium or a titanium alloy.

Stand-off member 632 and forward surface 640 of base portion 633, define a pocket 658 between cup-shaped body 630 and the upstream surface 683 of sleeve member 680 in which a biasing member 659 is disposed.

Pin guiding component 628 includes body portion 661, sealing flange 662 and boss 663. Body portion 661 is received in sleeve member 680 that is disposed in a stepped bore in an upstream surface of manifold 108 (not shown in FIG. 6).

In an embodiment, the fit between sleeve member 680 and stepped bore (not shown in FIG. 6) is a slide fit such that sleeve member 680 is removable from the stepped bore; however, in another embodiment, the fit between sleeve member 680 and the stepped bore is an interference fit such that sleeve member 680 is more permanently installed in the stepped bore. Similarly, the fit between pin guiding component 628 and sleeve member 680 may be either a slide fit or an interference fit.

Sleeve member 680 and beveled surface 676 at the forward end of pin guiding component 628 define a diverting channel 668 which serves to redirect molding material from the manifold channel (not shown in FIG. 6) to the manifold outlet (not shown in FIG. 6). In the current embodiment, diverting channel 668 includes an axial diverting segment 668A that is correspondingly sized to, and aligned with, the manifold outlet, and also includes a radial diverting segment 668R that is correspondingly sized to, and aligned with the manifold channel.

Sleeve member 680 defines a sleeve flange 682, the diameter of which is sized to fit within, or engage with an inside diameter of stand-off member 632, as shown at location E4 such that sleeve flange 682 locates actuator portion 627 relative to pin guiding component 628 by engagement between sleeve flange 682 and stand-off member 632 at location E4. Further, as the manifold grows laterally due to thermal expansion upon start-up of the hot runner system (not shown in FIG. 6), the relative location of sleeve member 680 and pin guiding component 628 within the hot half (not shown in FIG. 6) changes. Due to the engagement between sleeve flange 682 and actuator portion 627 at location E4, movement of pin guiding component 628 and sleeve member 680 also moves actuator portion 627, and the lateral force created by thermal expansion of the manifold is transferred to actuator portion 627 via sleeve flange 682.

Biasing member 659 is positioned between sleeve flange 682 and actuator portion 627 to create a spring force $F_S$ between sleeve flange 682 and base portion 633. Spring force $F_S$ urges actuator portion 627 away from the manifold and urges sleeve flange 682 into contact with the manifold.

As the manifold is heated to the required processing temperature, axial thermal expansion of the manifold causes biasing member 659 to compress until forward surface 640 of base portion 633 engages rearward surface 670 of sealing flange 662 and forward surface 672 of stand-off member 632 engages the upstream surface of the manifold. At this point, axial thermal expansion of the manifold causes clamping force $F_C$ between the back plate (not shown in FIG. 6) and the manifold to be transmitted through base portion 633, pin guiding component 628, and sleeve member 680, and also through perimeter wall 635 and stand-off member 632, to create a sealing load between the nozzle and the downstream surface of the manifold.

In the current embodiment, since base portion 633 bears upon sealing flange 662, clamping force $F_C$ maintains the forward surface 670 of sealing flange 662 in contact with rearward surface 683 of sleeve flange 682, and maintains a forward surface 684 of sleeve flange 682 in contact with the upstream surface of the manifold which retains both pin guiding component 628 in sleeve member 680, and sleeve member 680 in the manifold. Contact between forward surface 671 of sealing flange 662 and rearward surface 683 of sleeve member 680 creates a mechanical seal there between that prevents molding material that may migrate between body portion 661 and sleeve member 680 from migrating into pocket 658.

Similarly, contact between forward surface 684 of sleeve flange 682 and the upstream surface of the manifold creates a mechanical seal there between that prevents molding material that may migrate between the manifold bore and sleeve member 680 from migrating into the airspace around the manifold.

In the current embodiment, undercuts 666 in which molding material that may migrate between valve pin 643 and sealing bore 665 can collect are provided on a portion of valve pin 643 that remains engaged with sealing bore 665 throughout its range of motion.

In the proceeding embodiments, hot-half 102 is depicted as having a single manifold 108, through which molding material is delivered to a plurality of nozzles 109, each of which having a respective valve bushing 103; however, hot-halves having additional manifolds, and bridge manifolds are also contemplated.

It will be apparent to persons skilled in the relevant art that various changes in form and detail can be made therein without departing from the scope of the present disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A valve bushing comprising:
    an actuator portion including a cup-shaped body that defines in part a piston chamber configured to receive a piston for opening and closing a valve gate of a hot runner mold;
    a stand-off member that elevates the cup shaped body relative to an upstream surface of a manifold;
    a pin guiding component defining a sealing bore configured to slidably receive a valve pin coupled to the piston, the pin guiding component having a body portion receivable in a bore in the manifold and a radially extending flange configured to radially locate the actuator portion relative to the pin guiding component via the stand-off member; and
    a biasing member positioned to create a spring force between the cup-shaped body and the pin guiding component,
    wherein, when the manifold is heated to a processing temperature, a clamping force between the manifold and an adjacent mold plate is transferred through the cup-shaped body and the stand-off member.

2. The valve bushing according to claim 1 wherein the actuator portion is located relative to the pin guiding component via a transfer ring therebetween that engages the radially extending flange at a first location and the stand-off member at a second location.

3. The valve bushing according to claim 2 wherein the engagement between the transfer ring and the stand-off member at the first location has a greater bearing surface than the engagement between the transfer ring and the stand-off member at the second location.

4. The valve bushing according to claim 1, wherein the biasing member is disposed between a base portion of the cup-shaped body and the radially extending flange to create the spring force therebetween.

5. The valve bushing according to claim 4, wherein when the manifold is in the cold condition, the biasing member urges an open end of the cup-shaped body into contact with the adjacent mold plate to define a clearance gap between a forward end of the stand-off member and the manifold.

6. The valve bushing according to claim 1, wherein the body portion projects above the radially extending flange to in part define a step.

7. The valve bushing according to claim 6, wherein when the manifold is heated to a processing temperature, the clamping force between the manifold and the adjacent mold plate is transferred through a perimeter wall of the cup-shaped body and the stand-off member and through a base portion of the cup-shaped body and the radially extending flange via the step.

8. The valve bushing according to claim 2, wherein the transfer ring is an annular ring.

9. The valve bushing according to claim 1, wherein the stand-off member is an annular skirt.

10. The valve bushing according to claim 9, wherein a forward face of the stand-off member is castellated.

11. The valve bushing according to claim 9 wherein the stand-off member is scalloped.

12. The valve bushing according to claim 1, wherein the cup-shaped body and the stand-off member are discrete components.

13. The valve bushing according to claim 1, wherein the radially extending flange is a discrete component.

14. A valve bushing comprising:
    an actuator portion having a cup-shaped body and a stepped bore extending therethrough, the stepped bore defining in part a piston chamber configured to receive a piston for opening and closing a valve gate of a hot runner mold, and a transfer bore through a base portion of the cup-shaped body;
    a stand-off member that elevates the cup-shaped body relative to an upstream surface of a manifold;
    a pin guiding component defining a sealing bore extending therethrough and configured to slidably receive a valve pin coupled to the piston, the pin guiding component having a body portion receivable in a bore in the manifold, a boss extending rearward from the body portion into the transfer bore, and a radially extending flange configured to radially locate the actuator portion relative to the pin guiding component via the stand-off member, wherein a lateral force created by thermal expansion of the manifold is transferred through the radially extending flange to the actuator portion via the stand-off member.

15. The valve bushing according to claim 14, wherein the boss and the transfer bore define a thermal transfer area, and wherein a diameter of the boss is less than a length of the thermal transfer area.

16. The valve bushing according to claim 14, wherein a gap is provided between the boss and the transfer bore.

17. The valve bushing according to claim 16, wherein a separate fluid seal is provided in the gap between the boss and the base portion.

18. The valve bushing according to claim 14, wherein the boss includes an enlarged head portion.

19. The valve bushing according to claim 18, wherein a length of the enlarged head portion is less than a diameter of the enlarged head portion.

20. The valve bushing according to claim 14, wherein the actuator portion is located relative to the pin guiding component by engagement between the stand-off member and the flange.

21. The valve bushing according to claim 14, further comprising a biasing member disposed between the base portion of the cup-shaped body and the flange to create a spring force therebetween.

22. The valve bushing according to claim 21, wherein when the manifold is in the cold condition, the biasing member urges an open end of the cup-shaped body into contact with an adjacent mold plate to define a clearance gap between a forward end of the stand-off member and the manifold.

23. The valve bushing according to claim 16, wherein the gap is between 0.05 mm and 0.25 mm.

24. The valve bushing according to claim 14, wherein the stand-off member is an annular skirt.

25. The valve bushing according to claim 14, wherein the cup-shaped body and the stand-off member are discrete components.

26. The valve bushing according to claim 14, wherein the actuator portion is located relative to the pin guiding component via a transfer ring therebetween that engages the radially extending flange at a first location and the stand-off member at a second location.

27. The valve bushing according to claim 14, wherein the radially extending flange is a discrete component.

* * * * *